United States Patent
Brogni et al.

(10) Patent No.: US 9,914,180 B2
(45) Date of Patent: Mar. 13, 2018

(54) METHOD FOR PRODUCING AND/OR PROCESSING A GEAR AND GEAR CUTTING MACHINE

(71) Applicant: GLEASON-PFAUTER MASCHINENFABRIK GMBH, Ludwigsburg (DE)

(72) Inventors: Johannes Brogni, Dotzigen (CH); Gerhard Krebser, Affalterbach (DE); Christoph Schneider, Remseck (DE); Matthias Philippin, Rutesheim (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 0 days.

(21) Appl. No.: 14/891,687

(22) PCT Filed: May 20, 2014

(86) PCT No.: PCT/EP2014/001363
§ 371 (c)(1),
(2) Date: Nov. 17, 2015

(87) PCT Pub. No.: WO2014/187561
PCT Pub. Date: Nov. 27, 2014

(65) Prior Publication Data
US 2016/0114417 A1    Apr. 28, 2016

(30) Foreign Application Priority Data

May 22, 2013    (DE) .................. 10 2013 008 709

(51) Int. Cl.
*B23F 23/02*    (2006.01)
*B23F 17/00*    (2006.01)
(Continued)

(52) U.S. Cl.
CPC ............ *B23F 17/008* (2013.01); *B23F 23/04* (2013.01); *B23F 23/06* (2013.01); *B23F 17/006* (2013.01);
(Continued)

(58) Field of Classification Search
CPC ...... B23F 19/10; B23F 19/101; B23F 19/102; B23F 19/104; B23F 23/02; B23F 23/04;
(Continued)

(56) References Cited

U.S. PATENT DOCUMENTS 892,927 A * 7/1908 Bemis .................. B23Q 39/042
279/48
2,278,300 A * 3/1942 Barter ..................... B23F 19/10
29/76.1

(Continued)

FOREIGN PATENT DOCUMENTS

DE    19907617 A1    8/2000
DE    10249039 A1    5/2004
(Continued)

OTHER PUBLICATIONS

International Search Report and Written Opinion for PCT/EP2014/001363, ISA/EPO, dated Jan. 21, 2015, 14 pages, with English translation.

*Primary Examiner* — Daniel Howell
*Assistant Examiner* — Yasir Diab
(74) *Attorney, Agent, or Firm* — Robert L. McDowell

(57) ABSTRACT

The invention concerns a method to generate and/or machine gear teeth on a workpiece, wherein the workpiece is subjected to a movement from a first location where the workpiece, while being held by a clamping device connected to a workpiece spindle, is brought into machining engagement with a first tool, to a second location where the work piece, while remaining in its clamped condition, is (Continued)

brought into machining engagement with a second tool, wherein prior to performing the movement, the connection between the clamping device and the workpiece spindle is released, and after the movement, the clamping device is connected to another workpiece spindle for the machining engagement with the second tool.

21 Claims, 8 Drawing Sheets

(51) Int. Cl.
    *B23F 23/04*     (2006.01)
    *B23F 23/06*     (2006.01)
    *B23F 19/10*     (2006.01)
    *B23F 23/08*     (2006.01)

(52) U.S. Cl.
    CPC ............ *B23F 19/10* (2013.01); *B23F 19/101* (2013.01); *B23F 19/102* (2013.01); *B23F 19/104* (2013.01); *B23F 23/02* (2013.01); *B23F 23/08* (2013.01); *Y10T 409/10159* (2015.01); *Y10T 409/100954* (2015.01); *Y10T 409/101113* (2015.01); *Y10T 409/106201* (2015.01); *Y10T 409/109699* (2015.01)

(58) Field of Classification Search
    CPC ...... B23F 23/06; B23F 23/08; B23F 23/1293; B23F 17/006; Y10T 409/101113; Y10T 409/101272; Y10T 409/100954; Y10T 409/100795; Y10T 409/10159; Y10T 409/101749; Y10T 409/105088; Y10T 409/105724; Y10T 409/106201; Y10T 409/108586; Y10T 409/109699
    See application file for complete search history.

(56) References Cited

U.S. PATENT DOCUMENTS

| | | | |
|---|---|---|---|
| 6,185,818 B1* | 2/2001 | Ito ............................ | B23C 3/18 29/889.7 |
| 2002/0086628 A1* | 7/2002 | Blazek ..................... | B23Q 7/04 451/365 |
| 2002/0197121 A1* | 12/2002 | Mall ........................ | B23F 19/00 409/9 |
| 2007/0204732 A1* | 9/2007 | Feinauer ................. | B23B 3/065 82/117 |
| 2007/0234541 A1* | 10/2007 | Feinauer ................... | B23B 3/30 29/27 C |
| 2008/0152446 A1* | 6/2008 | Muller .................. | B23F 17/008 409/50 |
| 2009/0007735 A1 | 1/2009 | Mall | |
| 2009/0238654 A1* | 9/2009 | Jaeger ................... | B23F 17/006 409/12 |
| 2011/0081833 A1* | 4/2011 | Amarell ................. | B23F 23/04 451/28 |
| 2011/0098843 A1* | 4/2011 | Haas ..................... | B23Q 7/047 700/169 |

FOREIGN PATENT DOCUMENTS

| | | |
|---|---|---|
| DE | 102007019558 A1 | 10/2008 |
| DE | 102007030955 A1 | 1/2009 |
| DE | 102010028032 A1 | 10/2011 |

\* cited by examiner

METHOD FOR PRODUCING AND/OR PROCESSING A GEAR AND GEAR CUTTING MACHINE

The invention concerns a method to generate and/or machine gear teeth on a workpiece, wherein the workpiece is subjected to a movement from a first location where the workpiece, while being held by a clamping device connected to a workpiece spindle, is brought into machining engagement with a first tool, to a second location where the work piece, while remaining in its clamped condition, is brought into machining engagement with a second tool. The invention further concerns a gear-cutting machine designed to be employed in carrying out the method.

Methods of this kind for the machining of gear teeth, wherein two or more different tools are used to generate and/or machine the gear teeth, have long been known in the art. This includes for example the process of generating gear teeth on a workpiece blank in a first machining operation, for example by hobbing, and the subsequent chamfering and deburring of the machined teeth with the respective tools.

For this combined hobbing- and chamfering/deburring operation within a common machining space, there is on the one hand the likewise long known possibility to first generate the gear teeth on the workpiece blank after the latter has been clamped to the clamping device and then to perform the deburring at the same location. However, in this procedure the idle time of the hobbing tool during the deburring operation is seen as a problem, as it causes comparatively long non-productive time periods.

In another version of the method which is likewise known in the art and which aims to avoid the long non-productive time periods, the hobbing of the gear teeth as well as the deburring likewise take place while the workpiece is at the same location, but the two tools work in parallel on different sides of the workpiece. This reduces the idle time period of the main tool (the hob) essentially to the time interval required for the exchange of the machined workpiece against a new workpiece blank. A method of this kind is known for example from the hobbing machines of the model series P60/P90 manufactured by the firm of the applicant.

In more recent times, there have also been more and more frequent proposals for methods where, in order to minimize the idle time periods of the main tool, the workpiece spindle is moved from the location of the first operation to a second location where the second operation is performed, in this case the chamfering and deburring. At the same time, a further workpiece spindle with the next workpiece blank already clamped to it is moved to the first operating location. In these methods, which work in accordance with the generic part of claim 1, the movements of the spindle between the operating locations take place for example along a section of a circular path, a course of movement that is particularly easy to realize by arranging the spindles on a common rotating holder (turntable, rotary drum). The rotating holder only has to be advanced by 180° (in the case of two spindles) or by 360°/n (in the case of n spindles) in order to bring a workpiece from one operating location to the next. Examples of such hobbing—and chamfering/deburring operations that are combined within one operating space are disclosed for instance in EP 2 029 306 B1. They are normally referred to as dual-spindle systems (or multi-spindle systems).

Not only are these multi-spindle systems known for the aforementioned combined hobbing- and chamfering/deburring operations, but also for example for the grinding of gear teeth. As an example, the gear-grinding machine KX3 developed by the firm of Kapp uses a rotary holder carrying three workpiece spindles that are mounted at equal azimuthal intervals. At the three respective positions between which the workpieces that are clamped to the workpiece spindles can be moved, the gear teeth are rough-ground at a first location, then advanced to the next location where they undergo a finishing operation, and finally brought to the third location where they are removed from the operating space and replaced by a new workpiece to enter the grinding process.

Also, the use of a rotary holder saves time even in a case, where there is only one actual machining position provided for the workpiece, as disclosed for example in EP 1 146 983 B1. In the second position, the loading and unloading of the workpieces can take place and also a so-called centering operation where the rotary position of the tooth gap relative to a fixed rotary reference position of the workpiece spindle is determined with the help of sensors. As this spindle will next be the one moving the workpiece for the machining operation, the data to control the meshing of the tool with the teeth of the workpiece will have already been entered in the controller of the machine prior to arrival at the main operating location and thus will not have to be determined first at the main operating location, whereby the unproductive time spent on secondary operations is reduced.

To fixate the position of the rotary holder for these dual- or multi-spindle systems, it has further been proposed in EP 2 200 776 B1 that the drive mechanism which is already present for the rotation of the rotary holder could be used to move the rotary holder against a fixed stop and hold it in that position.

This invention has the objective to bring further improvements to methods of this kind for the machining of gear teeth with (at least) two operations, specifically in regard to an accurate and reliable way of positioning the machine axes to which the machining operations are referenced.

From a method-oriented point of view, the invention solves this task through a further development of a method of the kind described in the introduction, which is in essence distinguished by the feature that prior to performing the movement, the connection between the clamping device and the workpiece spindle is released, and after the movement, the clamping device is connected to another workpiece spindle for the machining engagement with the second tool.

Surprisingly, the aforementioned advantages of a rotary holder for the workpiece spindles that is advanced in a stepping movement in the operating space are given up by the invention, as the workpiece spindle, due to the release of its connection to the clamping device, remains at the location of the first operation, and the workpiece is connected by way of its clamping device to the workpiece spindle that is present at the location of the second operation. The workpiece spindles are thus no longer following the workpieces in their change of location. Instead, they can be arranged for example in the machine bed of the gear-cutting machine. Thus, one gains an overall increase in stiffness of the machine as a whole, with the result that the machine axes can be accurately and reliably positioned.

The expressions "first tool" and "second tool" should not be interpreted to mean that the invention is limited to exactly two spindles and exactly two machining operations. While this does represent an embodiment of the invention, other variants are possible in which three or more machining tools are employed at three or more locations.

In a preferred implementation of the inventive concept, the method can be designed so that in parallel with the machining of the workpiece at the second location, a gear tooth profile is being generated and or machined at the first location on a further workpiece which is being held by a second clamping device. With the possibility of performing machining operations in parallel, one can save machining time, whereby the productivity of the process is increased.

In the following, any references to the "machining of gear teeth" are also meant to include the initial operation of generating the toothed profile, for example by hobbing, as well as methods in which the toothed profile of the workpiece has already been generated prior to the initial machining operation, for example finishing operations on hardened workpieces, such as generation grinding.

Accordingly, the further workpiece, prior to the machining of its gear tooth profile at the first location, can be moved together with the clamping device to which it is connected to said first location from the second location, or from a third location that is different from the second location. This concept can be realized for example through a machine tool design where two workpieces trade places in the location-changing movement or, in the case of three locations, where the workpieces are advanced by one position.

In a possible version of the method, the workpiece, subsequent to the machining with the second tool, is machined again with the first tool. This can be advantageous for example if a chamfering- or deburring operation is performed with the second tool and the chamfering still leaves a secondary burr on the tooth flanks. This secondary burr can be removed with the tool that was used to machine/generate the gear teeth, for example a hob.

In a preferred design of the method, the respective location changes of the workpiece and of the further workpiece occur at the same time and are in particular coupled to each other. This saves additional machining time, and the number of drive motors required for the location changes is reduced.

In a variant of the method, a machined workpiece, subsequent to the release of its clamping device, is taken out of the operating space without the clamping device, and/or a workpiece that is to be machined is connected to a clamping device only after said workpiece has been brought into the operating space. Thus, the mechanisms used for the workpiece exchanges can be workpiece changers that are known per se in the art; on the other hand, it is also conceivable to remove the workpiece and its clamping device together from the operating space, depending on the mechanism that is used for the location change of the workpieces in the operating space.

In a particularly preferred implementation of the method, a connector portion of the workpiece spindle to which the clamping device is connected during the machining of the workpiece at the respective location is covered during at least a part of a time interval from the release of said connection until a new connection with a clamping device is made. Thus, the connector portion can be protected against chips that are produced in the machining.

This aspect of the invention, according to which a connector portion of the workpiece spindle that becomes exposed after the release of a clamping device is protected in particular against the entry of chips produced in the machining operation, is considered to be and disclosed as advantageous in itself and deserving of protection independently of the number of workpiece spindles being used.

Accordingly the invention also discloses independently, and as a concept that is independently deserving of protection, a method of generating and/or machining gear teeth on a workpiece, wherein said workpiece is brought into machining engagement with a tool while being held by a clamping device connected to a workpiece spindle, wherein the connection between the clamping device and the workpiece spindle is released and wherein, during at least a part of a time interval from the release of said connection until a new connection with a clamping device is made, a portion of the workpiece spindle which serves to connect the latter with the clamping device is shielded by a cover.

In a practical implementation of the method, the action of covering the connector portion is coupled to the location-changing movement of the workpiece. Thus, no additional actuator unit is needed in order to accomplish the covering, which simplifies the design of the machine.

For a collision-free machining engagement between a tool for gear teeth and the toothed workpiece, the mutual spatial positions of the workpiece and the tool relative to each other need to be set correctly. This is normally accomplished with a suitable CNC-controlled coordination of the respective rotary positions of the workpiece shaft and the workpiece spindle shaft, provided that the position of the toothed workpiece in relation to a reference point on the workpiece spindle axis is known. To determine this rotary position, a so-called indexing process for the determination of the location of the tooth gap in a gear profile could be included in the method, wherein the teeth of a gear that is to be processed are scanned with a sensor based in particular on a contact-free principle, and wherein based on the scanning signal, the signal representing the rotary (angular) position is generated by a specifically programmed controller device.

However, due to the fact that the workpiece remains connected to the clamping device, the result of this process, which is also referred to as "centering" within the firm of the applicant, can be achieved more easily by putting a sensor-detectable mark on the workpiece or its clamping device. While it is still necessary to register the mark with a sensor, the more time-consuming determination of the angular position of a tooth gap has been eliminated.

According to a particularly preferred design of the method, the respective machining engagements of the workpiece with the first and the second tool are determined by their respective mutual spatial positions, and the setting of the mutual spatial position for the second machining engagement is dependent on the mutual spatial position in the first machining operation. A centering operation is in this case no longer necessary, since a specified angular position of a tooth gap of a gear profile can be prescribed and stored as a known quantity, for example in the memory of a controller device or also in the form of a given position of a marking on the clamping device. In particular, this arrangement makes use of the fact that in the case of an initial machining operation in the form of an initial generation of the toothed profile, because of the symmetry of the workpiece blank, centering information is initially not needed and is standardized by the initial generation of the gear profile.

This principle of setting a mutual spatial position between a toothed workpiece and a tool dependent on the mutual spatial position between the workpiece and a tool that was engaged in a previous machining- and/or generating operation of the workpiece is likewise disclosed independently of the other aspects of the method described hereinabove and is as such considered deserving of protection.

Accordingly, the invention discloses independently, and as a concept that is independently deserving of protection, a method of machining a workpiece, wherein the workpiece is machined with two tools in two consecutive processing steps and each of the two machining engagements is determined by the mutual spatial position between the workpiece and the tool, and wherein the method is distinguished in essence by the fact that the mutual spatial position that is set between the workpiece and the second tool in the second processing step depends on the mutual spatial position between the workpiece and the first tool in the first processing step, and that this applies in particular to the case where different workpiece spindles are used in the first and second processing steps.

According to a variant of the method that should be mentioned in this context, a change of the rotary position of the workpiece which may occur during the location change of the latter can be determined by given mechanical constraints, for example if the clamping device can be connected to the workpiece spindle only in defined rotary positions relative to the latter, for example by means of CAPTO™ systems. If the absolute rotary position changes due to the location change, for example if the location change includes a swivel movement, the swivel angle and the distance from the axis of rotation are known, and the absolute change of the rotary position of the clamping device can therefore be calculated. Also within this context, it is intended for the relative rotary position between the clamping device and the holder that carries the clamping device to remain unchanged during the location change.

From a device-oriented point of view, the task described above is solved by a gear-cutting machine with at least two tools which are arranged in an operating space for the generating and/or machining of gear teeth on a workpiece, and with at least two workpiece spindles serving to support workpieces that are held by respective clamping devices that are capable of rotation, in particular a driven rotation, so that a first clamped workpiece can be brought into machining engagement with a first tool and, in parallel, a second clamped workpiece can be brought into machining engagement with a second tool, wherein the gear-cutting machine is distinguished in essence by a mechanism serving to release and to close a connection between a clamping device and a workpiece spindle, and by a device that moves a workpiece from one workpiece spindle to another workpiece spindle while the workpiece remains connected to the clamping device.

The advantages of the gear-cutting machine according to the invention will be evident from the foregoing description of the inventive method.

In a particularly preferred embodiment, the workpiece-moving device comprises a holder for one of the clamping devices, which can swivel about a rotary axis of the workpiece-moving device. Accordingly, a rotary movement of the workpiece-moving device in connection with a swivel movement of the holder is preferred for example over a linear movement.

As a preferred feature, it is intended for the workpiece-moving device to include at least one further holder designed to swivel about the rotary axis, for a further clamping device, wherein in particular the movements of the holders are rigidly coupled to each other by a coupling connection between the holders. From a device-oriented point of view, this accomplishes the purpose explained above, i.e. the possibility of an automatic trading of locations in the case of two spindles, and the step advance to the next machining position in the case of three or more spindles in a rigidly coupled movement.

The coupling between the holders can be configured in the form of a carrier that is shared in common by the holders and which is rotatable about the rotary axis. In other words, the holders are configured as holding portions of the carrier. The hold exerted by the holders on the clamping devices is deactivated during the machining engagements. The carrier is therefore not subjected to any machining forces during the machining process, so that no special measures are required to support the carrier in a rigid stationary position.

To activate the hold on the clamping devices, the workpiece-moving device is designed with the capability to move a holder or the carrier in such a way that a vector component of the movement is directed parallel to at least one of the workpiece spindle axes. In a preferred embodiment, the two spindle axes are arranged parallel to each other, and the carrier performs a lifting movement directed along the workpiece spindle axis. The lifting movement engages in particular the hold of the holders or holding portions on the clamping devices and also causes in particular the separation of the clamping devices from the workpiece spindles.

In a particularly preferred embodiment, the gear-cutting machine includes a covering device which during the machining of the workpiece covers up a connector portion of the workpiece spindle to which the clamping device is connected during the machining of the workpiece at the respective location during at least part of a time period from the release of said connection by the connecting mechanism until a new connection with a clamping device is made.

This aspect of the invention which serves for the protection from chips has already been explained above and should be considered deserving of protection also from a device-oriented point of view.

Accordingly, the invention also discloses, as an independent concept that is in itself deserving of protection, a gear-cutting machine with at least one tool that is arranged in an operating space and serves to generate and/or machine a toothed profile on a workpiece, with at least one workpiece spindle by means of which a workpiece that is held by a clamping device can be rotatably supported, particularly in a driven rotary movement, further with a mechanism to release and to close a connection between the clamping device and the workpiece spindle, and with a covering device which, during at least part of a time period from the release of said connection by the connecting mechanism until a new connection with a clamping device is made, covers up a connector portion of the workpiece spindle to which the clamping device is connected during the machining of the workpiece at the respective location.

In a particularly preferred embodiment of the invention, the covering device is coupled to a holder to move in tandem with the latter. In particular, the covering device is formed by a portion of the carrier. This concept allows the covering effect to be achieved in a particularly simple manner.

The primary and principal concept of the invention requires that the workpiece spindles not participate in the location change of the workpieces. However, this does not preclude a change of the absolute position of the workpiece spindles for example in relation to a machine bed; but with particular preference the workpiece spindles are arranged in a spatially fixed position relative to the gear-cutting machine. In regard to the orientation of the workpiece spindle axes, the invention is likewise not subject to any particular restrictions. In particular, layouts with horizontally oriented workpiece spindles are possible, especially for the machining of workpieces in the form of rotary shafts. In a particularly preferred embodiment, however, the workpiece spindle axes run vertically, and a rotary axis for the carrier performing the location change is likewise oriented vertically.

Advantageously, the workpiece spindles are supported by one machine bed that they share in common. This is a particularly simple way to achieve an increase in the overall rigidity of the machine.

In regard to the rotary movement of the workpiece-moving device, two design possibilities are conceivable. In one embodiment, the workpiece-moving device is designed to allow a reversal of direction of its rotary movements and to include the requisite control capabilities. In the case where the invention is realized with three spindles (first spindle assigned to a hobbing position, second spindle assigned to a chamfering/deburring station, third spindle assigned to a loading/unloading station), a workpiece could for example be loaded into machine at the loading/unloading station, then be brought to the hobbing station, then further in the same rotary direction to the chamfering/deburring station, then in the reverse rotary direction back to the hobbing station for a second hobbing pass to remove the secondary burrs on the tooth flanks.

As an alternative and likewise preferred concept, however, the workpiece-moving device advances the carrier always in the same rotary direction. However, a controller device could also be designed to allow the selection of one or the other of the two options.

The workpieces can be brought into, and removed from, the operating space at a position where also a machining operation takes place, or at a dedicated loading/unloading station. According to a preferred design, the clamping connection of a workpiece to a clamping device that is in a connected state with a workpiece spindle is releasable, in particular by way of an actuating access created within the connector mechanism. This allows the use of workpiece changers that are known per se and is particularly conducive to a compact configuration of a carrier whose holder portions surround the clamping devices at least partially, preferably covering more than 180° of the circumference.

In the interest of a simple design, it is possible to provide the aforementioned actuating access only at the loading/unloading station and omit it at the other operating stations.

In a preferred embodiment, the carrier additionally carries a tool that can be brought into operating engagement with at least one of the tools that serve for the machining of the workpiece. This is particularly advantageous for machining tools that require dressing such as dressable grinding worms or grinding disks, as a dressing tool can be brought into engagement with the dressable grinding tools by way of the workpiece-moving device.

According to a possible embodiment of the invention, a clamping device is provided with at least one mark through which the rotary position of the clamping device in relation to the workpiece spindle can be registered by a sensor. The advantages to be gained with this feature have already been described above in the presentation of the method.

In this context, the connector mechanism is preferably designed to allow the connection of a clamping device to a workpiece spindle in only one relative rotary position or in a plurality of defined relative rotary positions, in particular by way of a form-locking engagement and/or a locking device which is activated during the location change to secure the rotary position between the holder and the clamping device. In regard to the connection between the clamping device and the workpiece spindle, systems performing this function are already known per se and include for example CAPTO™ systems.

A controller device of the gear-cutting machine is preferably designed and operable to control a gear-cutting machine by following a method in accordance with one of the methods aspects named above.

In particular, it is intended for the controller device to acquire data defining the mutual spatial positions of a workpiece and a tool performing a machining operation in relation to each other, and to keep said data available for a subsequent machining operation with another tool. Specifically, the acquisition of data defining the mutual spatial positions can relate to the machining operation that generates the gear profile.

In a particularly preferred embodiment, the first tool is a hob, while the second tool is a chamfering- and/or deburring tool.

The loading- and unloading station can either coincide with the chamfering/deburring station, or a third workpiece spindle could be arranged for the loading/unloading function.

In a preferred further configuration of the machine, a third tool in the form of a shaving tool is arranged in the operating space, with a third workpiece spindle assigned to it. In this embodiment, the loading/unloading position can coincide with the position for the shaving operation, or it can be arranged at the location of an additional, fourth workpiece spindle.

The method according to the invention and the gear-cutting machine according to the invention are suitable for the machining of workpieces in the form of gear wheels. Besides, they are also suitable for the machining of workpieces in the form of rotary shafts that are to include gear teeth. In this case, the gear-cutting machine can additionally include a tailstock arrangement.

In this regard, it is particularly preferred that the tailstock arrangement be coupled to the workpiece-moving device and arranged in particular on the carrier. With particular preference, is intended for a tailstock to have as many tailstock centers as there are workpiece spindles, wherein each tailstock center is assigned to a workpiece spindle and the tailstock centers are movable independently of each other in the direction of the workpiece spindle axes. As a further possible feature, the tailstock centers can be designed to exert a compressive force which is acting on the shafts in the direction of the workpiece spindle axes during the location change but can be deactivated during the machining of the shafts.

This aspect of the invention is again disclosed independently, and as a concept that is independently deserving of protection.

Accordingly the invention also discloses independently, and as a concept that is independently deserving of protection, a tailstock arrangement for a gear-cutting machine, in particular according to one of the configurations described above, wherein the tailstock arrangement can be installed on a rotary carrier, and in particular with axial mobility relative to the latter, and wherein the arrangement includes at least two tailstock centers as well as holder areas that lie opposite the tailstock centers towards the side of the spindles and serve to hold the same number of clamping devices as there are tailstock centers, designed in particular for workpieces in the form of shafts, wherein an axial distance between a tailstock center and its associated holder area can be changed independently of the other axial distances, and/or wherein a tailstock center can in a first operating position exert a holding force acting in the axial direction towards the associated holder area, and said holding force can in a second operating position take on a reduced value or be deactivated entirely.

The holding force acting in the axial direction towards the holder should be seen as a force that can be applied in addition to, and independently of, the clamping force that is produced by tightening the axial distance. The holding force can in particular be realized with a spring arrangement that is capable of being deactivated.

Further distinguishing features, details and advantages of the invention will become evident from the following description which refers to the attached drawings, wherein FIG. 1 schematically represents portions of a gear-cutting machine according to the invention in a perspective view.

Figure 1:
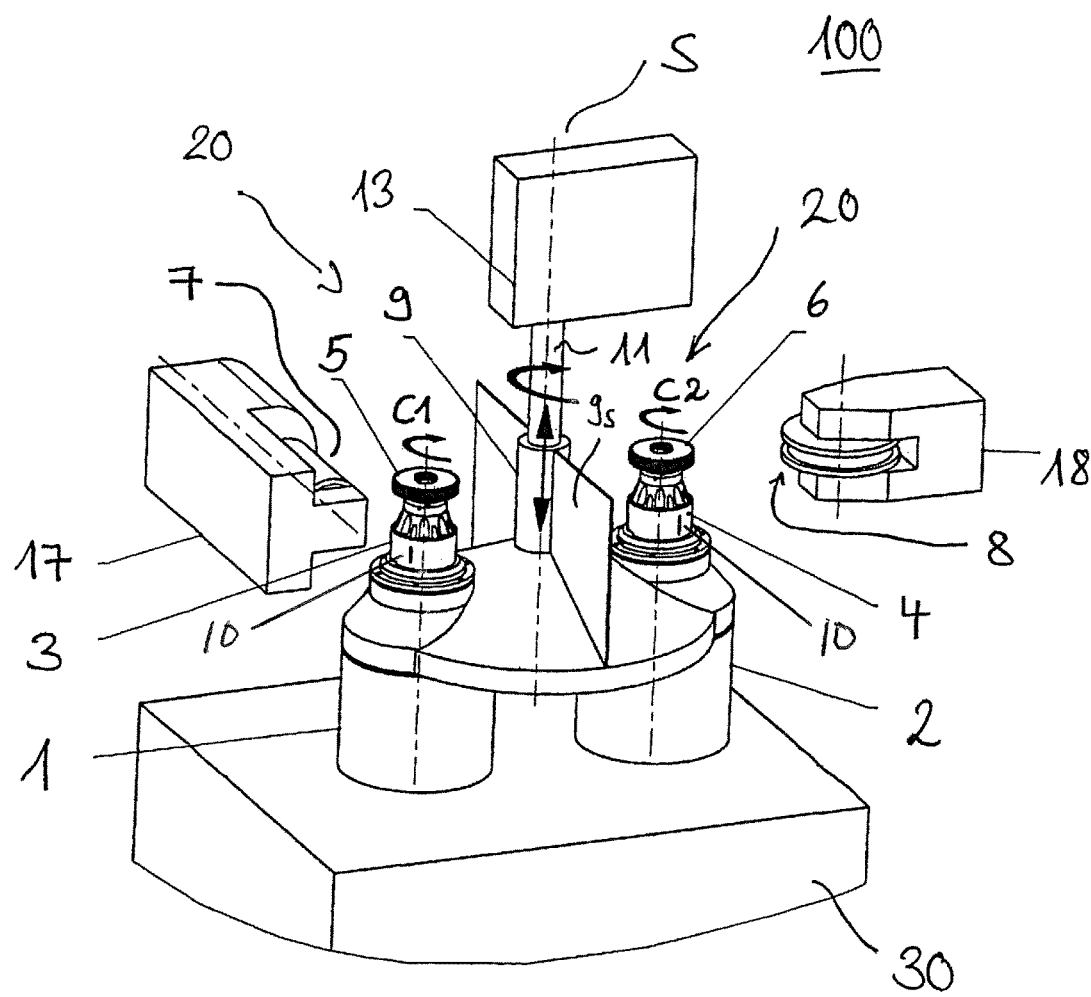

FIG. 1 shows a first embodiment of the invention in a schematically simplified perspective view. The gear-cutting machine 100, shown here only in parts, is designed for the hobbing and also for a combined chamfering- and deburring operation of toothed workpieces. To perform these operations, the gear-cutting machine 100 has a milling head with a tool holder 17 carrying a hob 7 (indicated schematically) whose rotation is powered by a drive source. Although not shown in FIG. 1, the spatial position of the hob 7 is controlled along the machine axes that are conventionally used for hobbing, including in this case a vertical mobility, a horizontal mobility for a radial feed movement, an angular swiveling movement of the rotary axis of the hob 7 preferably about the feed axis, as well as a shifting movement of the hob along its axis of rotation.

The operating space 20 of the gear-cutting machine 100 extends to a chamfering/deburring tool 8 which is rotatably supported in a holder 1. The chamfering/deburring tool is likewise provided with mobility along the conventional axes, including at least a radial infeed axis as well as a vertical movement axis.

Arranged below the operating space 20 of the gear-cutting machine 100 extending between the hob 7 and the chamfering/deburring tool 8 is a portion 30 of a machine bed of the gear-cutting machine 100 in which a first workpiece spindle 1 is arranged on the side of the hob 7 and a second workpiece spindle 2 is arranged on the side of the chamfering/deburring tool 8. The workpiece spindles 1 and 2, whose respective spindle axes C1 and C2 are fixed in their positions relative to the machine bed portion 30, can be put into rotation for example by direct drives, preferably under CNC control, with one direct drive for each spindle.

The first workpiece spindle 1 with the hob 7 thus constitutes a first operating station, and the second workpiece spindle 2 with the chamfering/deburring tool 8 constitutes a second operating station of the gear-cutting machine 100. At the first operating station, a hobbing operation is performed to generate a gear profile on a workpiece 5 which in the illustration of FIG. 1 is held by a first clamping device 3 which is rotationally locked to the spindle 1 during the machining engagement between the hob 7 and the workpiece 5. At the second operating station, FIG. 1 shows a second workpiece 6 being brought into machining engagement with the chamfering/deburring tool 8. For this operation, the second workpiece 6 is held by a second clamping device 4 which during the machining engagement is rotationally locked to the spindle 2. Within the operating space 20, a hobbing operation can thus be performed on the workpiece 5 while a chamfering- and deburring operation is being performed in parallel at the same time on the second workpiece 6 which has already been through the generating operation. One or both of the clamping devices 3, 4 may include at least one mark 10 by which the rotary position of the clamping device in relation to the workpiece spindle can be registered by a sensor.

After a workpiece has completed the machining process, it is preferably removed from the operating space 20 while it is at the second operating station, for example by means of a tool-changer device (known in the art and not shown in the drawing) which grips the workpiece after its hold in the clamping device has been released, and the removed workpiece is replaced by a new workpiece that has yet to be machined.

To move the first workpiece 5 from the first operating position into the second operating position after generating its gear profile, the first workpiece 5 is brought to the second operating position by means of a carrier 9 while remaining clamped to the first clamping device 3. However, in contrast to the state of the art, the first workpiece spindle 1 is not taken along by the carrier 9 in this position change of the workpiece 5. Rather, the first workpiece spindle 1 remains in the portion 30 of the machine bed.

To perform this function, the carrier 9 is movable in its axial direction parallel to the workpiece spindle axes by means of a lifting and turning shaft 11, as indicated by the double arrow in FIG. 1. In addition, it can perform a rotary movement about the axis S. The drive mechanisms required for these two movements are not shown in FIG. 1, but they could be accommodated in the supporting structure 13 which is arranged on the gear-cutting machine 100 in a fixed position relative to the machine bed portion 30 and into which the lifting and turning shaft 11 can be retracted.

To switch the place of the first work piece 5 with the second workpiece 6 or with a workpiece blank instead of the second workpiece 6 fastened in the clamping device, the first step is an upward displacement of the carrier 9 in order to vertically separate the first clamping device 3 from the first workpiece spindle 1 as well as the second clamping device 4 from the second workpiece spindle 2 after their connections have been released, for example by loosening the HSK-fittings of clamping collets installed in the workpiece spindles, wherein the clamping devices in their connected state are pulled into a cone or against a flat counter surface of the HSK-fitting. The upward displacement of the carrier 9 is at least large enough that a subsequent swivel movement of the clamping devices 3, 4 by way of a rotation of the carrier 9 about the axis S can take place without a collision between the clamping devices and the spindle shafts, as will be more clearly evident from the sectional views of FIGS. 2 and 3. After a swivel movement of the carrier 9 by 180°, the carrier 9 is lowered again, the second clamping device 4 is connected to the first workpiece spindle 1 and the first clamping device 3 is connected to the second workpiece spindle 2. Now the first workpiece 5 in the second operating position can be brought into operating engagement with the chamfering/deburring tool 8, while the workpiece held by the second clamping device 4 can be machined with the hob 7.

In this embodiment with two workpiece spindles and a hobbing station as well as a chamfering and deburring station, a procedural order is conceivable where each workpiece passes through the first operating station only once, according to the sequence of steps: clamping the workpiece at the second operating positions, moving the workpiece to the first operating position, hobbing the workpiece in the first operating position, moving the workpiece to the second operating position, chamfering and deburring the workpiece at the second operating position, and removing the workpiece from the operating space 20. However, it is also possible to add a step where, before leaving the operating space 20, the workpieces are returned to the first operating station, where the hob 7 performs another hobbing pass with the same or a deeper infeed position to remove secondary burrs that may have been caused by the chamfering of the tooth flanks. In this latter case, the clamping device that holds the workpiece is disconnected from one and reconnected to the other of the workpiece spindles a total of four times.

Figure 2:
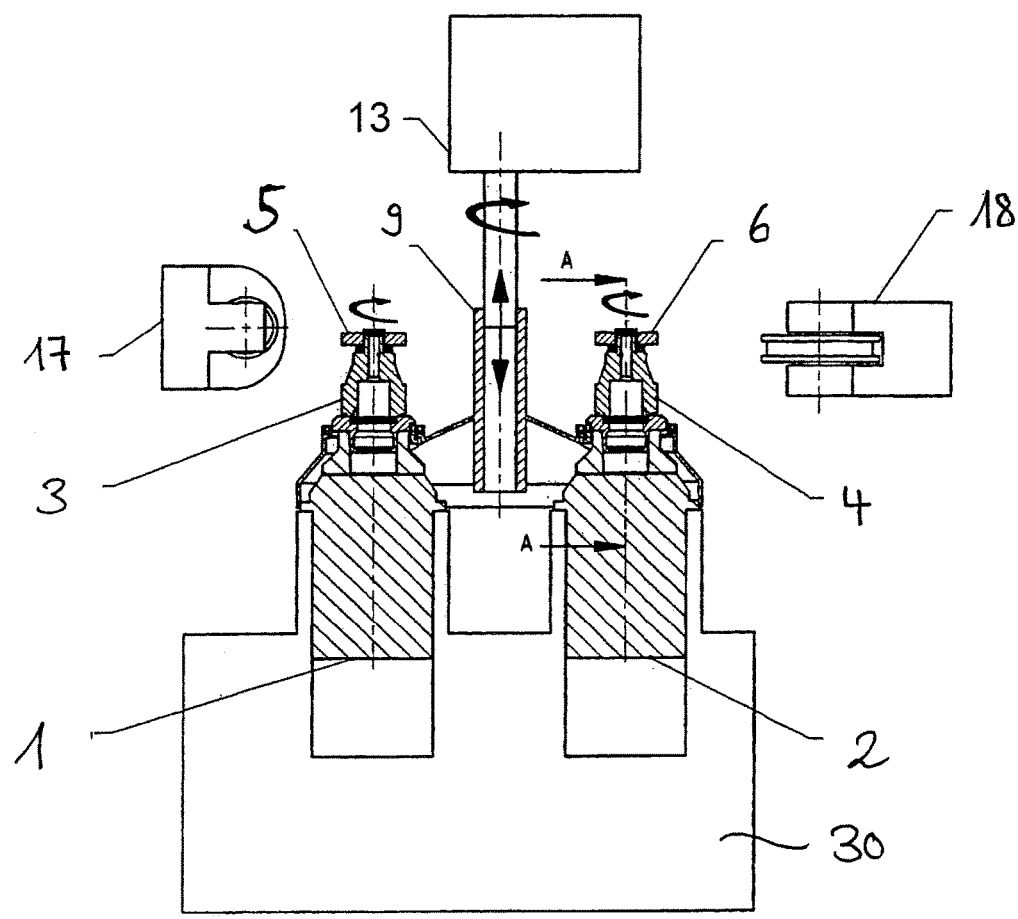
FIG. 2 represents an axial section of the arrangement of FIG. 1.
Figure 3:
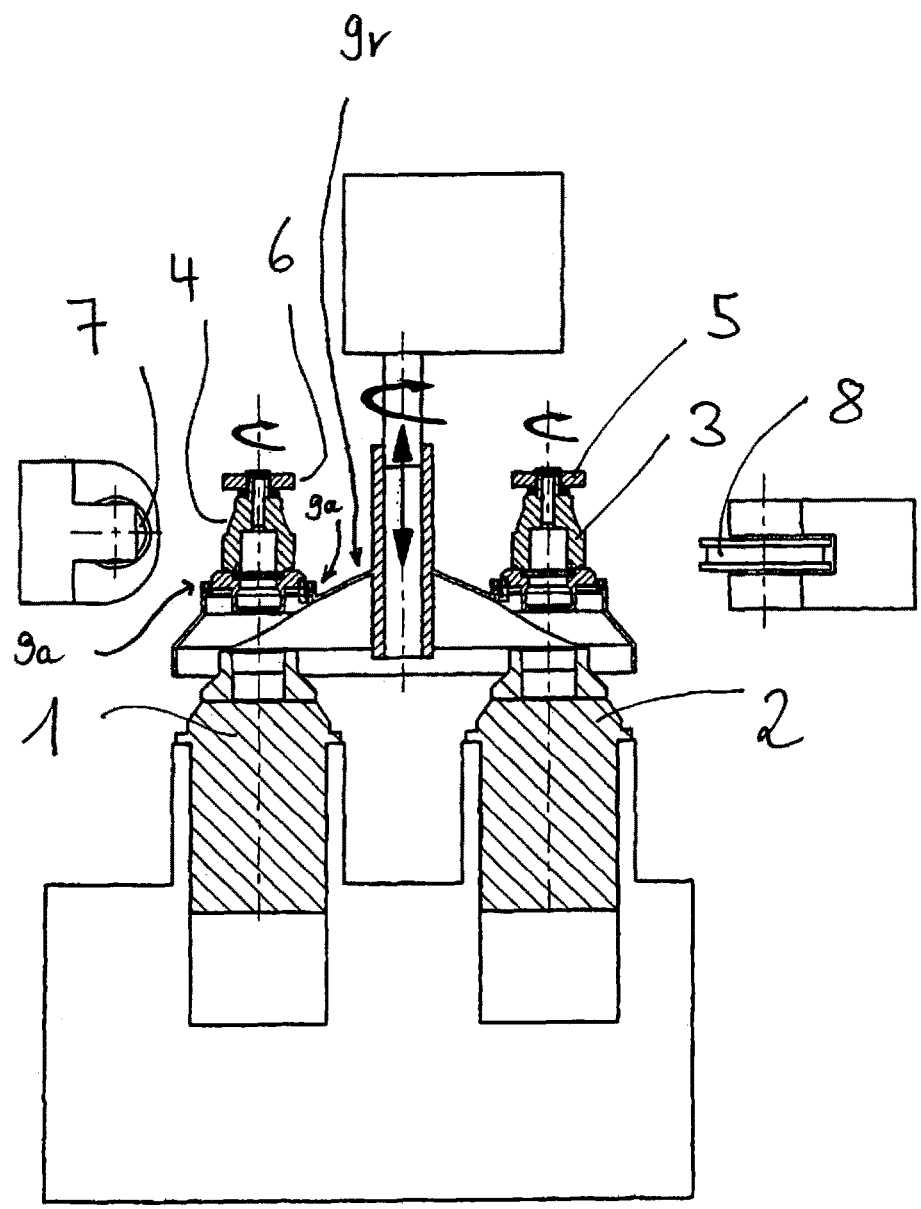
FIG. 3 represents an axial section that is analogous to FIG. 2, but in a different operating position.

FIG. 2, in a sectional plane containing the rotary axis S and the workpiece spindle axes C1, C2, illustrates an operating position that is assumed by the clamping devices 3, 4 and the carrier 9 in the machining of the workpieces 5, 6 with the tools 7, 8. In contrast, FIG. 3 shows the carrier 9 in a raised operating position, where the connections between the clamping devices and the workpiece spindles have been released, and the switching of places between the workpieces that remain fixed to their respective clamping devices can be or has already been performed by turning the carrier 9, so that a downward movement of the carrier 9 in the rotary position shown in FIG. 3 has the result that the first clamping device 3 is connected to the second workpiece spindle 2, while the second clamping device 4 is connected to the first workpiece spindle 1.

Figure 4:
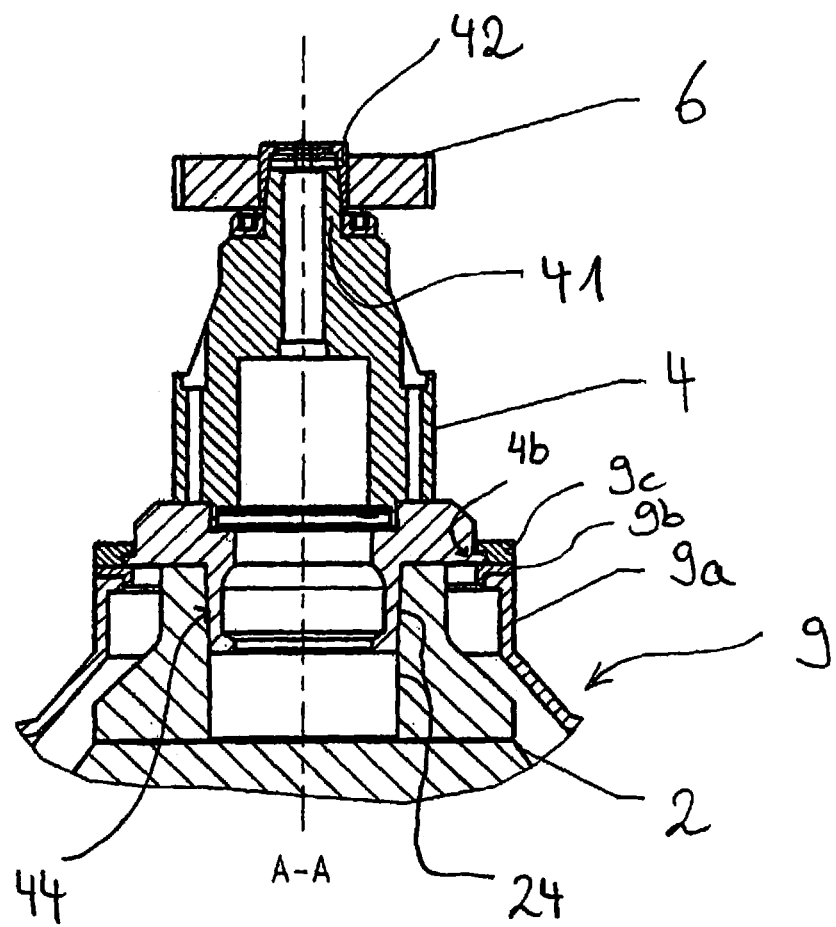
FIG. 4 represents an axial section of a detail area of FIG. 2.

FIG. 4 shows a sectional view along the line A-A of FIG. 2, which illustrates the connection between the second clamping device 4 and the second workpiece spindle 2 in an enlarged representation. As can be seen here, the end of the second workpiece spindle 2 next to the clamping device has a frusto-conical internal surface coaxial to its axis of rotation, with a widening conical taper in the direction towards the clamping device. The end of the clamping device 4 facing away from the workpiece-clamping area has a frusto-conical external surface 44 complementary to the internal surface 24. In the situation illustrated in FIG. 4, the external surface 44 and the internal surface 24 form a precise fit. The angular position of the mutually fitted surfaces relative to each other can be secured for example by a coupling engagement between rotationally asymmetric surface segments of the clamping device along the circumference of the latter and key blocks of complementary configuration which are provided for this purpose on the workpiece spindle.

The clamping device 4, at the end next to the workpiece, includes a clamping cone 41 that is coaxial to the rotary axis of the clamping device 4 and serves to hold the workpiece 6. Arranged on the frusto-conical outside surface of the clamping cone 41 is an expansion sleeve 42 whose inside surface is of complementary configuration to the outside surface of the clamping cone 41. With this arrangement, the expansion sleeve 42 can be shifted between a radially contracted and a radially expanded condition by changing the axial position of the expansion sleeve on the clamping cone. Obviously, instead of the clamping cone 41, there are also other means known in the art which could be used to vary the radius of the expansion sleeve.

In the operating position that is illustrated in FIG. 2, the workpiece spindle 2 with the clamping device 4, maintaining clearance and freedom of rotary movement relative to the carrier 9, passes through an opening in the latter which is delimited by a rim portion 9a. The configuration of the rim portion 9a with a portion 9b exerting a holding force on the clamping device 4 when the latter is raised (see FIG. 4) and with a flange portion 9c forming the end and reaching over the outermost radial flange 4b of the clamping device 4 does not interfere with the rotation of the workpiece spindle during the machining process while preventing chips as well as cooling—and/or lubricating agents from entering.

At least one of the operating positions, in the illustrated example the position of the second workpiece spindle 2, is equipped with an actuating mechanism (not shown in the drawing) whereby the workpiece 6 can be clamped to, as well as released from, the clamping device 4 by changing the radius of the expansion sleeve.

In the foregoing example, changing the location of a workpiece corresponds to a step advance of the carrier through a rotation of 180°, since there are two workpiece spindles. However, arrangements with three or more workpiece spindles are likewise possible, with a corresponding number of clamping devices that are advanced in angular steps of 360°/n, wherein n stands for the number of spindles. For example in the embodiment illustrated in FIG. 1, a third workpiece spindle could be added for the loading and unloading at a third location, i.e. to bring a workpiece into the operating space 20 and to remove it from the latter. It is for example also conceivable to design an operating space with four spindles, wherein two of the spindles perform the functions of the operating stations described in the context of FIG. 1, but are offset from each other by only 90° rather than being arranged diametrically opposite each other. Of the two additional stations, one is designed to bring a shaving tool into operating engagement with the workpiece, while the other is dedicated to the operating steps of loading and unloading. Accordingly, a workpiece can be machined in the following sequence of steps: loading-hobbing-chamfering/deburring-shaving-unloading.

As is evident from the foregoing description, in order to perform the function of switching the workpiece locations, the carrier 9 only needs to have the rim portion 9a (see FIG. 3) as well as a connection from the latter to the rotary axis S in the form of a radially extending portion 9r (see FIG. 3). However, in the illustrated embodiment, the carrier 9 extends from the axis S (in a plan view from above) not only towards the rim portion 9a but in all directions, as the body of the carrier 9 is of an essentially disk-shaped configuration. The radius is large enough that the space surrounded by the internal surface 24 of the workpiece spindle 2 (and also of the workpiece spindle 1 which is of analogous configuration in regard to this internal surface) remains covered during a rotation of the carrier 9. Thus, no chips can enter into this space during the position switch of the workpieces with the clamping devices. In the illustrated embodiment, the carrier 9 further includes a vertical separating wall 9s which stops flying chips during the machining process (se FIG. 1).

Figure 5:
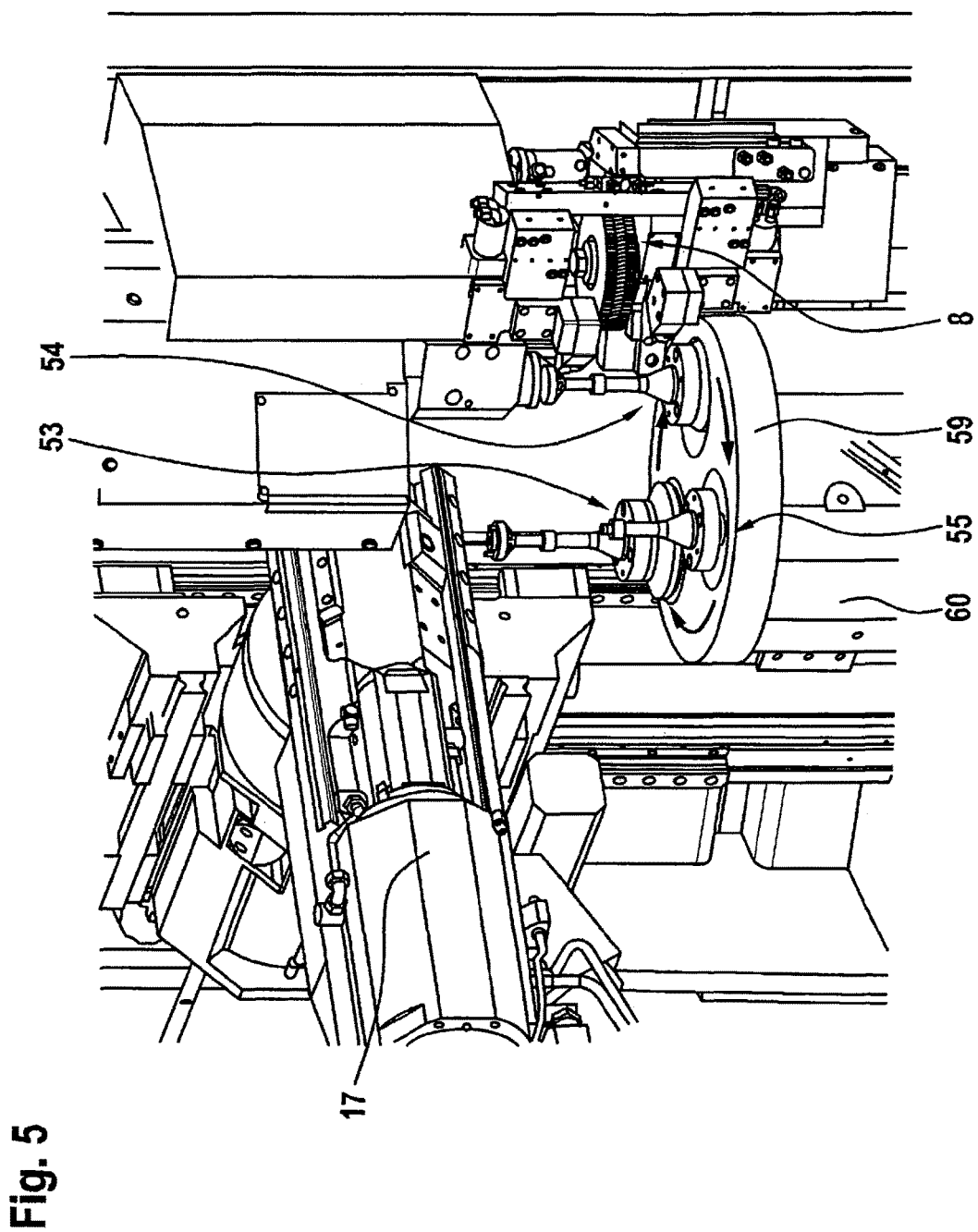
FIG. 5 shows portions of a gear-cutting machine according to a further embodiment of the invention.

FIG. 5 illustrates a further embodiment of the invention, wherein three workpiece spindles are supported on a base 60, individually rotatable for example by means of direct-acting drive sources. Analogous to the carrier 9 of FIG. 1, the carrier 59 in FIG. 5 performs an upward movement relative to the base 60 and thereby separates the clamping devices 53, 54 and 55 from the three workpiece spindles before the movement to the next position. However, in contrast to the embodiment of FIG. 1, the lifting device provided for this purpose as well as the rotary drive mechanism for the stepping movement of the carrier 59 are arranged below, rather than above, the carrier 59, i.e. in the base 60.

In addition, the clamping devices 53, 54 and 55 (see FIG. 8) are also suitable for the clamping of workpieces in the shape of rotary shafts. The basic principle of advancing the workpiece in steps is still the same, in that the workpieces remain connected to the clamping devices 53, 54 and 55 as they advance to the next position, without taking the workpiece spindles along. In the snapshot shown in FIG. 5, the clamping device 53 can be seen in the machining position where the hob is operating, while the clamping device 54 is at the operating station with the chamfering/deburring tool 8, and the clamping device 55 is at a position where the workpieces can be exchanged, i.e. where a completed workpiece is taken out of the operating space of the machine and replaced by a new, not yet machined workpiece.

Figure 6:
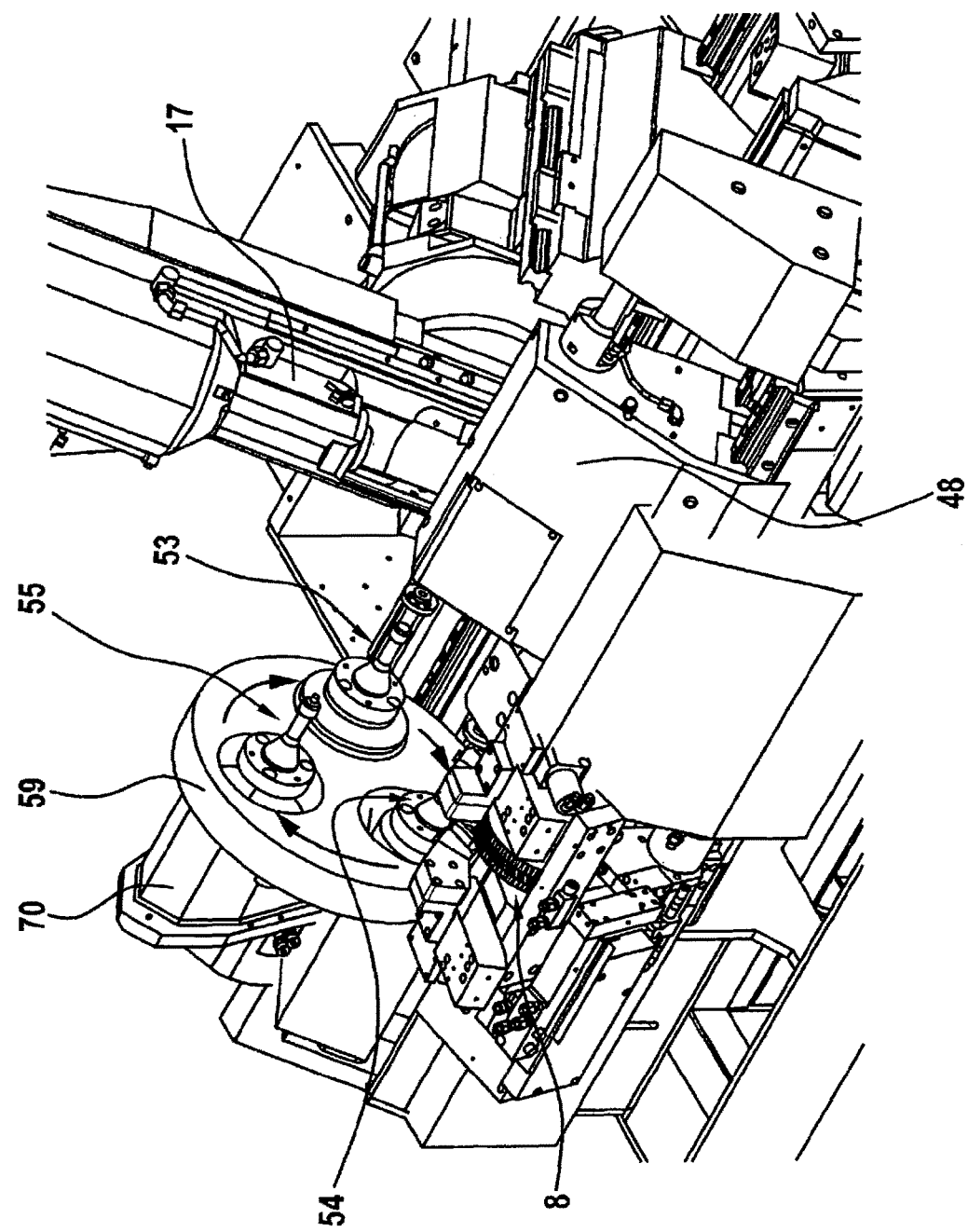
FIG. 6 shows portions of a gear-cutting machine according to a still further embodiment of the invention.

FIG. 6 illustrates a further embodiment in which a hobbing machine is configured as a horizontal hobbing machine. Accordingly, the workpiece spindle axes are oriented horizontally. The movement of the carrier 59 relative to the machine portion 70 that holds the spindles is likewise directed horizontally, as is the rotary axis for the step-advance movement of the carrier 59.

Opposite the machine portion 70 is a tailstock arrangement containing as many tailstock centers as there are workpiece spindles, as is normally the case in the machining of workpieces in the shape of rotary shafts.

Figure 7:
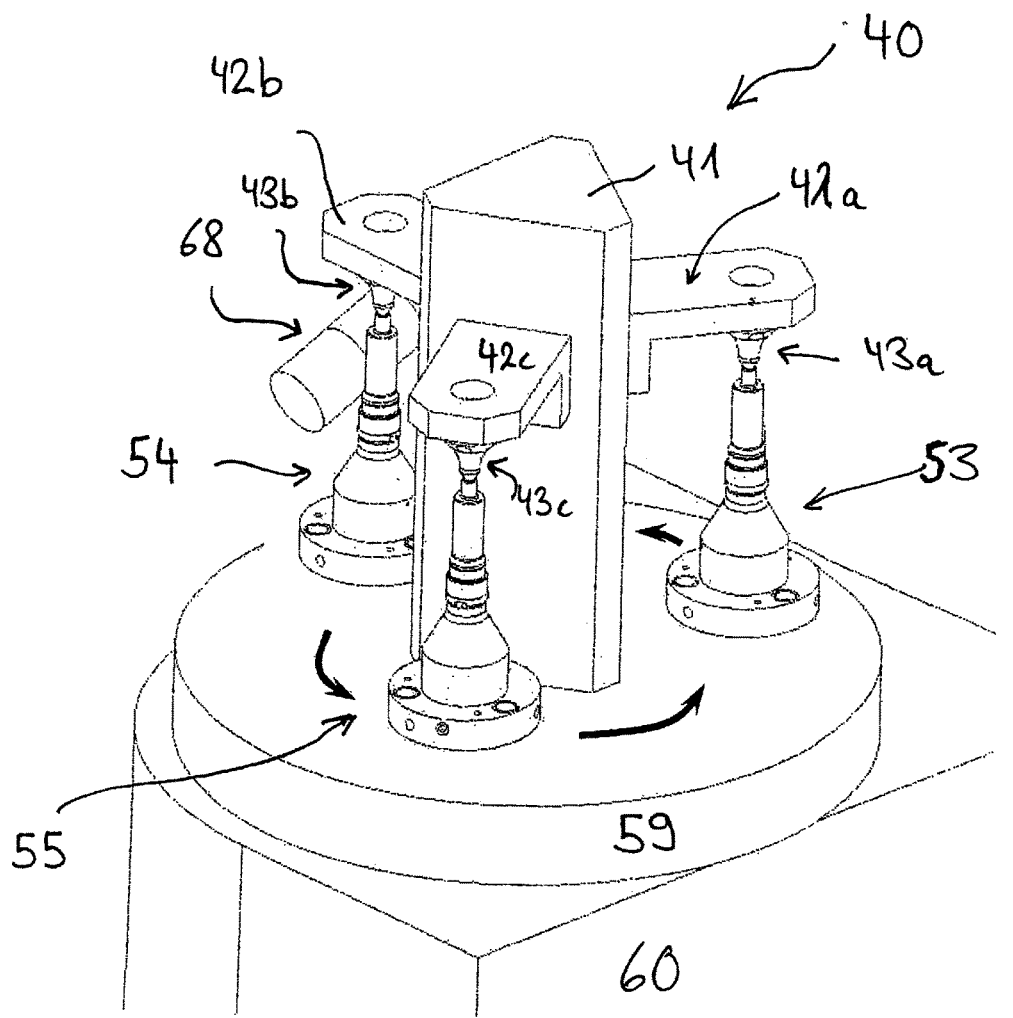
FIG. 7 shows a tailstock arrangement.

In the embodiment shown in FIG. 7, on the other hand, a tailstock arrangement 40 is connected to the carrier 59 in a rotationally fixed position relative to the latter. The tailstock arrangement 40 has a tailstock column 41 extending in the direction of the rotary axis of the carrier 59. The tailstock column 41 can for example have a polygonal cross-section corresponding to the number of workpiece spindles being used. In the embodiment of FIG. 7 with three workpiece spindles and three clamping devices 53, 54, 55, the cross-section of the tailstock column 41 is essentially triangular. Cantilever brackets 42a, 42b, 42c projecting radially outward from the lateral surfaces carry the tailstock centers 43a, 43b, 43c which are positioned opposite the clamping devices 53, 54, 55 to which they are permanently assigned.

Figure 8:
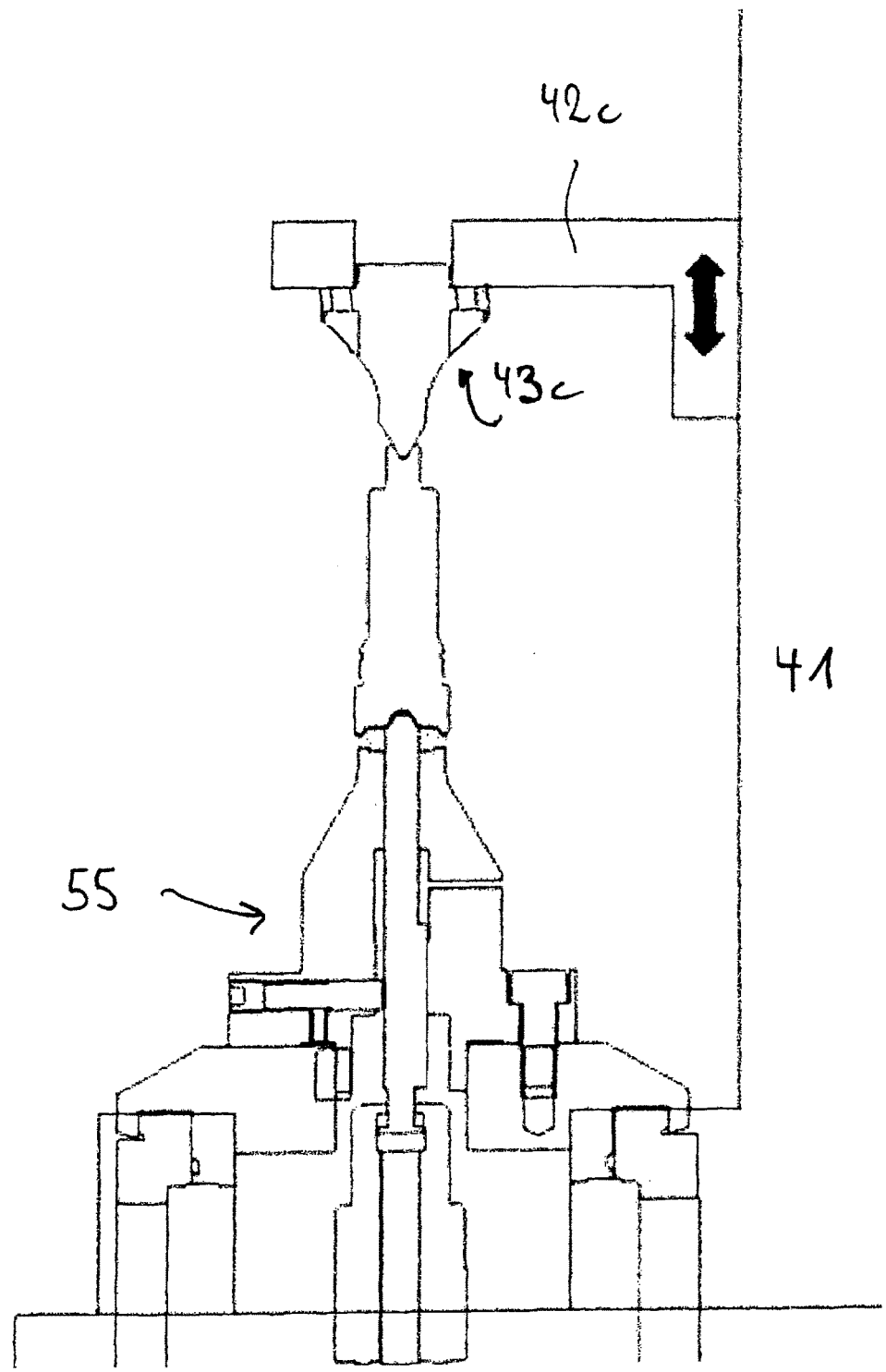
FIG. 8 shows an axial section of a detail portion corresponding to an area of FIG. 7.

As indicated in FIG. 8 by the double arrow, the cantilever brackets 42a, 42b, 42c are arranged with the ability to move independently of each other relative to the tailstock column in the axial direction of the workpiece spindles. In spite of the rigid connection between the tailstock column 41 and the rotary carrier 59, this arrangement makes it possible for example to exchange the workpiece connected to the clamping device 56 in FIG. 7 by raising the tailstock center 43c and to simultaneously machine the workpieces held by the clamping device 53 (tool not shown in the drawing) and the clamping device 54 with a tool 68, for example a grinding worm for the finishing of workpieces that have been rough-machined at the preceding operating position.

During the movement from one position to the next, the tailstock centers 43a, 43b, 43c are pressed against their respective workpieces, for example by means of a spring force. However, this spring-biased engagement is needed only for the time interval in which the clamping devices 53, 54, 55 are separated from their workpiece spindles. During the machining, this function is inactive, and the tailstock centers are again solidly coupled to the respective cantilever brackets 42a, 42b and 42c.

Consistent with normal practice, the means for securing the rotational position of the workpieces are arranged on the side of the spindles, while the tailstock centers are only securing the axial position.

While FIG. 7 symbolically indicates a grinding worm 68 as the tool of the second operating station, the illustrated tailstock arrangement 40 can of course also be used for other gear-machining processes including for example the previously described sequence of hobbing-chamfering/deburring-workpiece exchange in the case of three spindles. However, the tailstock arrangement 40 can also be used for layouts with two or with more than three clamping devices with the corresponding number of tailstock centers 43 and an appropriate coupling arrangement.

Furthermore, the tailstock arrangement illustrated in FIG. 7 can also be used in machines where the workpiece spindles are not oriented vertically, for example with a horizontal arrangement of the workpiece spindles.

The carrier 59 which is shown in FIGS. 5 and 7 with vertically oriented spindle axes is again configured as a disk which covers up the connector areas of the workpiece spindles that are arranged in the base 60, so that the connector areas are protected from chips and other impurities.

In FIGS. 5 to 7, the arrows symbolizing the rotation of the carrier 59 indicate that the stepping movements of the carrier 59 in these examples always occur in the same rotary direction. However, for special machining sequences, in particular if a workpiece is machined twice by the same tool with an interruption in between, it is also conceivable to reverse the rotary direction and to provide the requisite control capabilities.

As has been described hereinabove, during the stepping movement the clamping devices 53, 54, 55 maintain their rotary positions in relation to the carrier 59, and since the workpieces remain clamped, the position of the tooth gaps of the workpieces is traceable from one operation to the next and therefore does not have to be determined anew.

This traceability is maintained not only during the rotation of the carrier 59 but also in the case of a possible power failure. Depending on the desired control action, the stationary workpiece spindles can be held in their positions while they are uncoupled from the clamping devices, or they can also be turned so that a given azimuthal reference of any of the workpiece spindles always takes on the same rotary position relative to a given azimuthal reference of a clamping device.

The invention is not limited to the details described hereinabove in the context of the individual examples of constructively realized embodiments. Rather, the features set forth in the following claims as well as in the description, used individually or in combination, can be essential for the practice of the invention in its different embodiments.

The invention claimed is:

1. Method of generating and/or machining gear teeth on a workpiece (5), wherein the workpiece is subjected to a movement from a first location where the workpiece, while being held by a clamping device (3) connected to a workpiece spindle (1), is brought into machining engagement with a first tool (7), to a second location where the workpiece, while remaining in its clamped condition, is brought into machining engagement with a second tool (8), characterized in that prior to performing the movement, the connection between the clamping device (3) and the workpiece spindle (1) is released, and after the movement, the clamping device (3) is connected to another workpiece spindle (2) for the machining engagement with the second tool (8).

2. Method according to claim 1, wherein in parallel with the machining of the workpiece at the second location, a gear tooth profile is being generated and or machined at the first location on a further workpiece (6) which is being held by a second clamping device.

3. Method according to claim 1 wherein the workpiece, subsequent to the machining with the second tool, is machined again with the first tool.

4. Method according to claim 1 wherein the respective location changes of the workpiece and of the further workpiece occur at the same time and are coupled to each other.

5. Method according to claim 4, wherein a machined workpiece, subsequent to the release of its clamping device, is taken out of the operating space without the clamping device, and/or a workpiece that is to be machined is connected to a clamping device only after said workpiece has been brought into the operating space.

6. Method according to claim 1 wherein a connector portion of the workpiece spindle to which the clamping device is connected during the machining of the workpiece at the respective location is covered during a time interval from the release of said connection until a new connection with a clamping device is made.

7. Method according to claim 1 wherein the respective machining engagements of the workpiece with the first and the second tool are determined by their respective mutual spatial positions, and wherein the setting of the mutual spatial position for the second machining engagement is dependent on the mutual spatial position in the first machining operation.

8. Gear-cutting machine (100) with at least two tools (7, 8) which are arranged in an operating space (20) for the generating and/or machining of gear teeth on a workpiece, and with at least two workpiece spindles (1, 2) serving to support workpieces (5, 6) that are held by respective clamping devices (3, 4) that are capable of rotation so that a first clamped workpiece (5) can be brought into machining engagement with a first tool (7) and, in parallel, a second clamped workpiece (6) can be brought into machining engagement with a second tool (8),
characterized by
a connector mechanism serving to release and to close a connection between a clamping device and a workpiece spindle, and
a device that moves a workpiece from one workpiece spindle to another workpiece spindle while the workpiece remains connected to the clamping device.

9. Gear-cutting machine according to claim 8, wherein the workpiece-moving device comprises a holder (9a) for one of the clamping devices (4), which can swivel about a rotary axis (S) of the workpiece-moving device.

10. Gear-cutting machine according to claim 9, wherein the workpiece-moving device comprises at least one further holder (9a) which can swivel about the rotary axis, for a further clamping device (3), and wherein the movements of the holders are rigidly coupled to each other by a coupling connection (9r) between the holders (9a).

11. Gear-cutting machine according to claim 10, wherein the coupling is configured in the form of a common carrier for the holders (9a) which is rotatable about the rotary axis.

12. Gear-cutting machine according to claim 11 wherein the workpiece-moving device is designed with the capability to move a holder or the common carrier (9) with a directional component of the movement running parallel to at least one of the workpiece spindle axes.

13. Gear-cutting machine according to claim 8 with a covering device which, during at least part of a time interval from the release of said connection by the connecting mechanism until a new connection with a clamping device is made, covers up a connector portion of the workpiece spindle to which the clamping device is connected during the machining of the workpiece at the respective location.

14. Gear-cutting machine according to claim 11, wherein the covering device is coupled to a holder (9a) to move in tandem, with the latter, and wherein the covering device is formed by a portion (9r) of the common carrier (9).

15. Gear-cutting machine according to claim 8 wherein the workpiece spindles (1, 2) are arranged in a fixed position in space and their workpiece spindle axes are oriented vertically.

16. Gear-cutting machine according to claim 8 wherein the clamping connection of a workpiece to a clamping device that is in a connected state with a workpiece spindle is releasable by way of an actuating access created within the connector mechanism.

17. Gear-cutting machine according to claim 11 wherein the carrier additionally carries a tool that can be brought into machining engagement with at least one of the tools that serve for the machining of the workpiece.

18. Gear-cutting machine according to claim 8 wherein a clamping device comprises at least one mark through which the rotary position of the clamping device in relation to the workpiece spindle can be detected by a sensor.

19. Gear-cutting machine according to claim 8 wherein the connector mechanism allows a clamping device and a workpiece spindle to be connected to each other in only one defined relative rotary position or in a plurality of defined relative rotary positions by means of a form-fitting engagement acting in circumferential direction and/or by means of a rotary position lock between the holder and the clamping device which is effective during the position change.

20. Gear-cutting machine according to claim 8 further comprising a controller device, wherein the controller device acquires data defining the mutual spatial positions of a workpiece and a tool performing a machining operation in relation to each other, and keeps said data available for a subsequent machining operation with another tool.

21. Gear-cutting machine according to claim 8 wherein the first tool is a hob (7) and the second tool is a chamfering- and/or deburring tool (8), and wherein a third workpiece spindle which is assigned to a shaving station with a shaving tool is arranged within the operating space, wherein the workpieces are taken out of, or brought into, the operating space at the third workpiece spindle or at a fourth workpiece spindle.

* * * * *